(12) United States Patent
Marocco et al.

(10) Patent No.: US 7,254,899 B2
(45) Date of Patent: Aug. 14, 2007

(54) ARCH MEASURING DEVICE

(75) Inventors: Mario Marocco, Woodbridge (CA);
Norbert Marocco, Woodbridge (CA)

(73) Assignee: Shade-O-Matic Ltd., Toronto, Ontario (CA)

( * ) Notice: Subject to any disclaimer, the term of this patent is extended or adjusted under 35 U.S.C. 154(b) by 0 days.

(21) Appl. No.: 11/282,766

(22) Filed: Nov. 17, 2005

(65) Prior Publication Data
US 2007/0107249 A1    May 17, 2007

(51) Int. Cl.
*B43L 9/04* (2006.01)
*G01B 3/10* (2006.01)

(52) U.S. Cl. .................. 33/760; 33/435; 33/561.1; 33/518

(58) Field of Classification Search .................. 33/760, 33/27.032, 435, 452, 465, 471, 472, 473, 33/538, 561.1, 561.2, 561.3, 562, 518
See application file for complete search history.

(56) References Cited

U.S. PATENT DOCUMENTS

| | | | |
|---|---|---|---|
| 845,009 A | 2/1907 | Novak | |
| 1,559,386 A | 10/1925 | Valentine | |
| 1,946,377 A * | 2/1934 | Wynd | 33/561.1 |
| D136,978 S * | 1/1944 | Tomasini | D10/71 |
| 3,368,286 A * | 2/1968 | Zenke | 33/518 |
| 5,357,683 A | 10/1994 | Trevino | |
| 5,500,934 A | 3/1996 | Byrne | |
| 5,537,805 A * | 7/1996 | Allman | 52/749.13 |
| 5,584,329 A | 12/1996 | Thomas | |
| 5,713,135 A | 2/1998 | Acopulos | |
| 5,782,007 A * | 7/1998 | Harris | 33/468 |
| 5,794,680 A | 8/1998 | Xue | |
| 5,915,807 A * | 6/1999 | Ilagan | 33/471 |
| 6,453,568 B1 * | 9/2002 | Hymer | 33/276 |
| 6,651,722 B1 | 11/2003 | Fleishman et al. | |
| 6,865,817 B2 | 3/2005 | Militello et al. | |
| 2005/0050813 A1 | 3/2005 | McAree | |
| 2005/0246917 A1 * | 11/2005 | Webb et al. | 33/760 |

* cited by examiner

*Primary Examiner*—Christopher W. Fulton
(74) *Attorney, Agent, or Firm*—Ohlandt, Greeley, Ruggiero & Perle, L.L.P.

(57) ABSTRACT

A measuring device for measuring the arc of an arched window comprising a base; measuring means selectively rotatable relative said base for measuring a distance between said base and said arch at a selected angle.

20 Claims, 11 Drawing Sheets

Section B-B
FIG. 16

ARCH MEASURING DEVICE

FIELD OF INVENTION

This invention relates to an arch measuring device and in particular relates to a device having a base and measurement structure rotatable relative the base. The measuring device can comprise a tape measure or laser. The invention also relates to a method of measuring an arch as well as a template for verifying same.

BACKGROUND TO THE INVENTION

It is known to provide a window covering for an arched window. Examples of such window covering include those described in U.S. Pat. Nos. 5,794,680 and 5,584,329.

Some arched windows coverings include the manufacture of an arched frame.

Various devices have heretofore been proposed for measuring arched windows.

For example, U.S. patent publication no. 2005/0050813 A1 relates to a trigonometric measuring device for obtaining measurements of palladium or arched windows particularly in difficult positions, such as high places where standing upon a ladder and for creating a template suitable for design and installation of window treatments.

Moreover U.S. Pat. No. 6,865,817 relates to a window shade with a measurement guide while U.S. Pat. No. 6,651,722 relates to an arched blind for semi-circular arched windows.

Other devices and methods are disclosed in U.S. Pat. Nos. 1,559,386, 5,713,135, 5,357,683, 5,550,904 and 845,009.

Other methods include tracing the curvature of the arched window with a piece of paper. However, this is generally not accurate since the paper can shift particularly if using a ladder to measure the arch.

These and other devices and methods present relatively complicated structures.

It is an object of this invention to provide an improved arch measuring device and method for measuring same.

It is an aspect of this invention to provide a measuring device for measuring the arc of an arched window comprising a base, measuring structure selectively rotatable relative the base for measuring a distance between the base and the arc at a selected angle.

It is another aspect of this invention to provide a method of measuring an arch comprising releasably securing a base to the arch, the base including a measuring structure rotatable relative to the base; sequentially rotating the measuring structure relative the base for sequentially measuring a distance between the reference point and the arch at selected positions.

It is another aspect of this invention to provide a template for verifying the formed frame for an arch comprising a flat surface, a plurality of radially extending members; a plurality of scales associate with the plurality of radially extending members; and a plurality of measurement recording members slideably securable relative to the plurality of radially extending members for displaying a measurement adjacent the scale.

These and other objects and features of the invention shall now be described in relation to the following drawings

BRIEF DESCRIPTION OF DRAWINGS

The invention will be described by reference to the preferred embodiments and the drawings thereof in which.

DETAILED DESCRIPTION OF THE INVENTION

In the description which follows, like parts are marked throughout the specification and the drawings with the same respective reference numerals. The drawings are not necessarily to scale and in some instances proportions may have been exaggerated in order to more clearly depict certain features of the invention.

Figure 1:
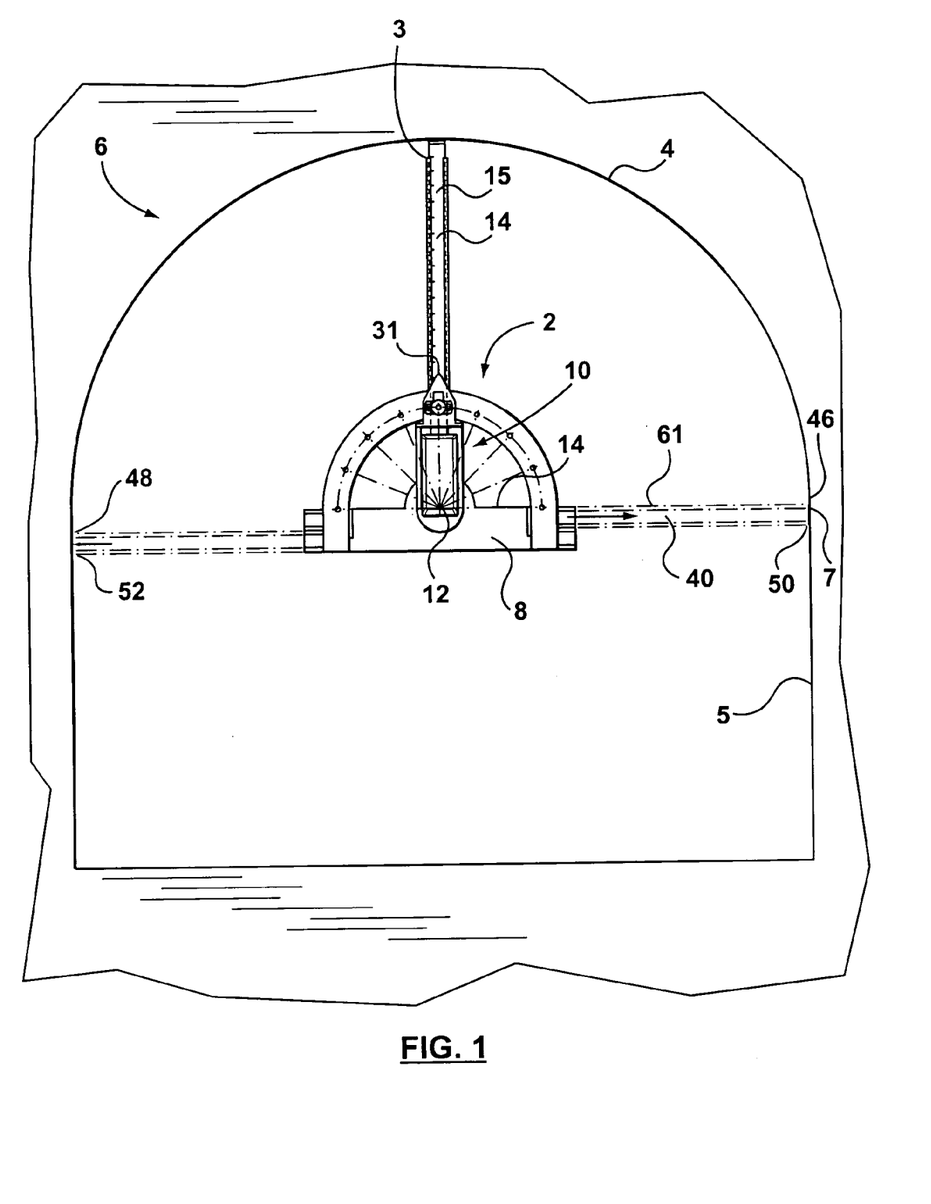
FIG. 1 is a front elevational view of the invention in relation to an arched window.

FIG. 1 illustrates one embodiment of the measuring device 2 for measuring the arch 4 of arched window, or arched opening in a wall, or an arched door.

The arched measuring device 2 comprises a base 8 and measuring means 10 which are rotatable or pivotable relative to the base 8.

The base 8 includes a reference position 12 which in the embodiment shown in FIG. 1 comprises a line 12 which extends substantially parallel to an edge 14 of the base 8. More specifically the reference point can comprise the centre of hole 36.

Figure 3:
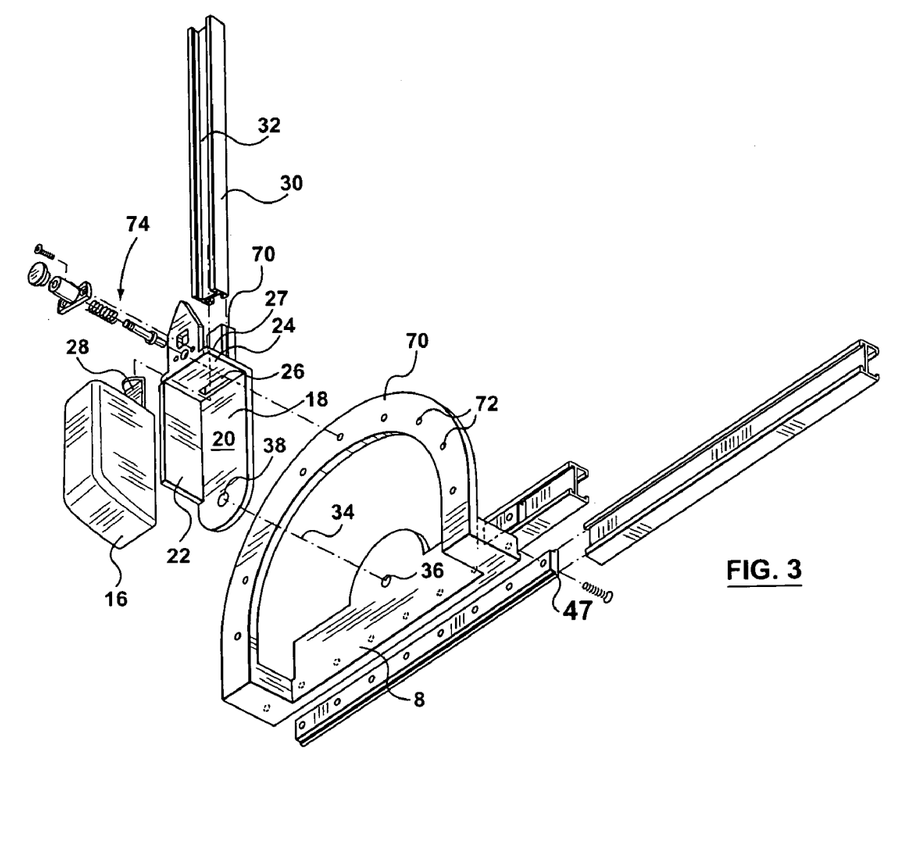
FIG. 3 is an exploded view of one embodiment of the arched measuring device comprising a tape measure.

In particular the measuring means 10 can comprise a moveable or displaceable scale 14 which in the embodiment shown in FIGS. 1 and 3 comprise a tape measure 16 which is carried by a holder 18. In particular the holder 18 includes a bottom 20 having at least one upstanding wall 22. Generally speaking the tape measure 16 includes a clip (not shown in FIG. 3) which may be clipped to the upstanding sidewall 22 for securement thereto. The holder 18 can also include a front face plate 24 having an opening 26 therein for receiving the retracting scale or tape measure 28 therethrough.

Figure 2:
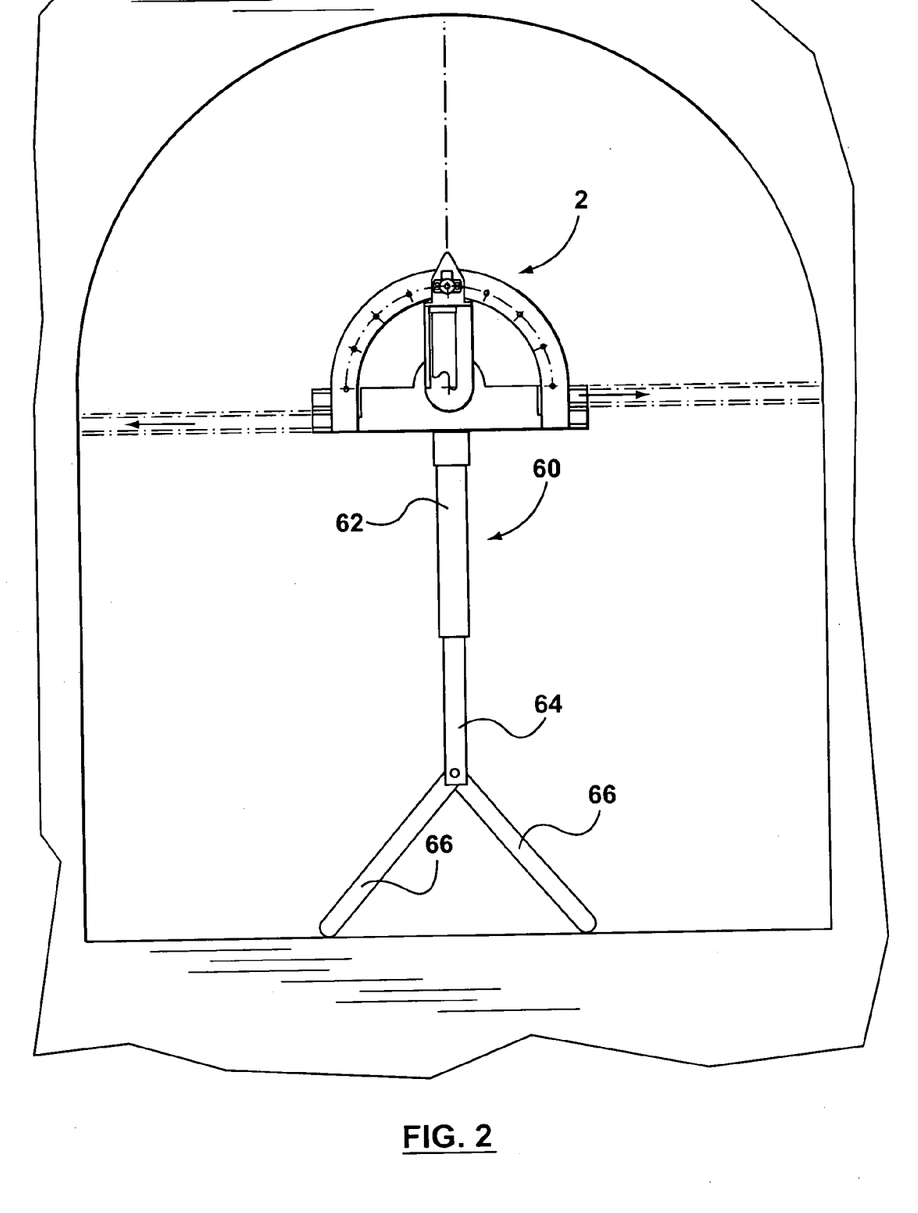
FIG. 2 is a front elevational view of another embodiment of the invention.

The holder 18 can in one embodiment include a scale guide 30 presenting a recess or channel 32 for guiding the extended tape measure 28 for slideable movement therein as shown in FIG. 1. In another embodiment of the invention as shown in FIG. 2, one can do away with the guide 32, particularly for smaller arched openings.

The holder 18 is selectively rotatable about axis 34. The axis 34 passes through a pivot hole 36 presented by the base 8 and holder hole 38 as shown. Accordingly, the axis 34 passes through the center of hole 36. The center of hole 36 is on reference line 14 which is substantially inline with the edge of base 8.

Figure 8:
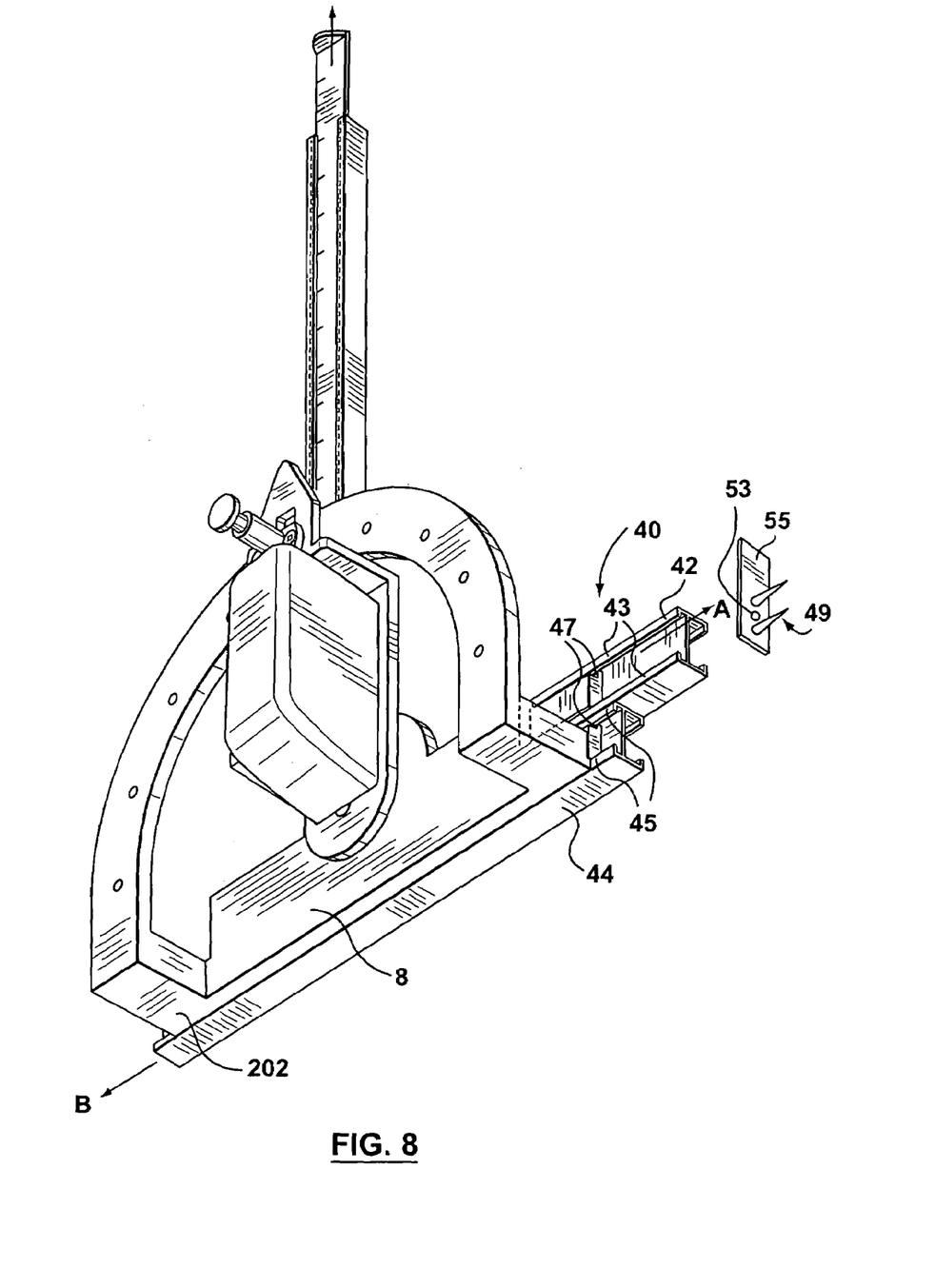
FIG. 8 is an assembled perspective view of FIG. 3.

The base 8 also includes anchoring or bracing means 40 which are shown in FIGS. 3 and 8 and comprise sliding braces or brackets 42 and 44. Braces 42 and 44 can slide in the direction of arrows A and B for securement to the sides of the arched window 46 and 48 as best seen in FIG. 1. More particularly the sliding braces 42 and 44 can comprise of a generally H-shaped cross-section member having turned edges 43 and 45 for sliding engagement with shoulders 47 presented by the base 8.

The distal ends 50 and 52 of the sliding braces 42 and 44 can include means for engagement with the sides of the arched window 46 and 48. For example, this can comprise of an end bracket 53 attachable to the distal ends 50, 52. The end bracket can have sharp edges 49 that bite into the sides of the arched window or screws that pass through holes 55 for securement thereto. In another embodiment the edges 43 and 45 can have an interference fit with shoulders 47 so as to permit extension of the sliding braces 42 and 44 in the direction of arrows A and B so as to permit the ends 50 and 52 to interfere with the sides 46 and 48.

In another embodiment of the invention as shown in FIG. 2, the measuring device 2 can include a telescoping support 60 having telescoping members 62 and 64 and legs 66. The telescoping support 60 can be used in addition to the slideable brace 42 and 44 or in lieu thereof. The telescoping support can be adjusted by sliding telescoping members 62 and 64 relative to one another so as to place the measuring device 2 in the optimal measuring position. For example, the measuring device 2 can be placed such that the reference point 36 is in line with one edge 61 of the sliding brace 42 which intersects the transition of the arched portion of the window 4 with the straight sides 5 as represented by the position 7 as shown in FIG. 1. The telescoping support is attachable to the device 2.

Figures 4, 6, 7:
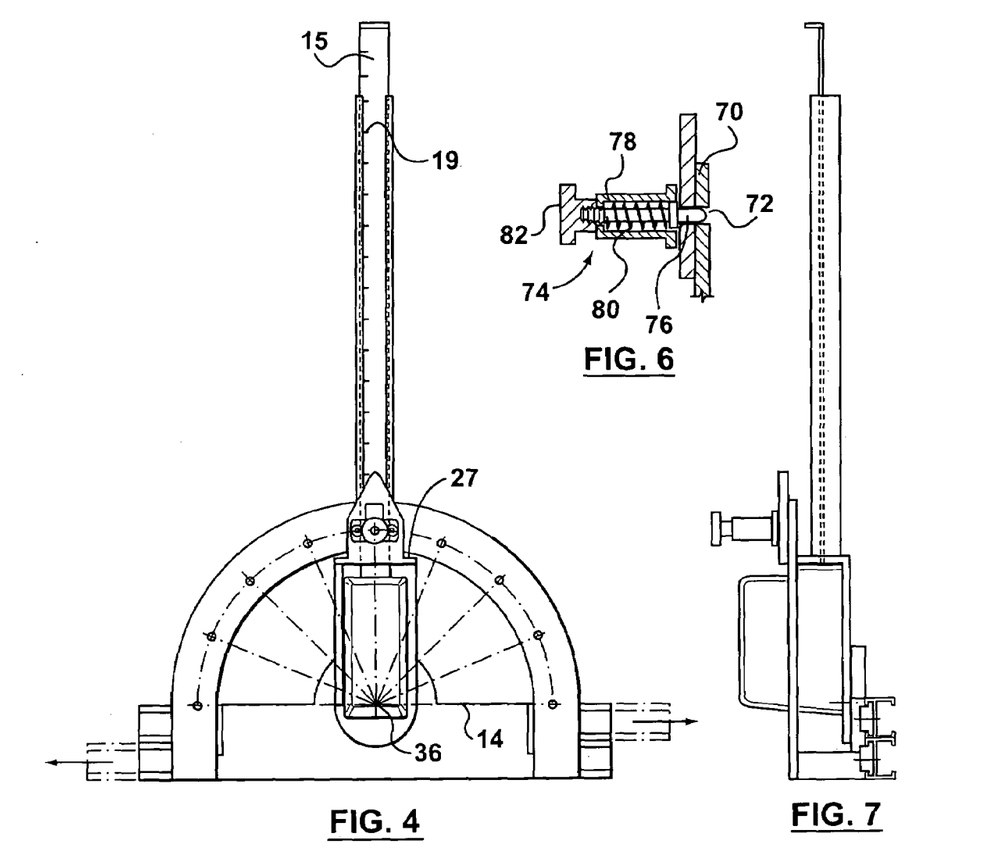
FIG. 4 is a top plan view of FIG. 3.
FIG. 6 is a cross-sectional view of a detent means.
FIG. 7 is a side elevational view of FIG. 4.
Figure 5:
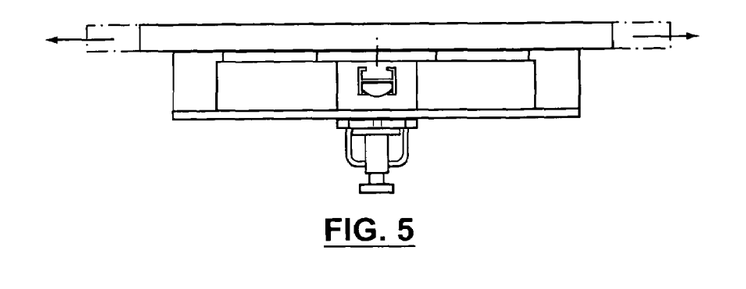
FIG. 5 is an end view of FIG. 4.

Moreover when utilizing the tape measure 16 as the measuring device 2 the tape measure scale 15 is adjusted so as start from the reference (ie. center of hole 36). In other words, the scale 15 as show in FIG. 4 has indicia 19 which is read from the center of hole 36. More particularly if the tape measure 16 as shown in FIG. 4 is in the retracted position, the end of the tape measure 28 will include the distance from the front face 27 of the front wall 24 and the center of holder hole 38. More specifically as the tape or scale 15 is retracted the user will use the reading point 31 to visually read the measurement on the scale 15 so as to read the measurement from the arch 4 at the 12 o'clock position shown in FIG. 1 to the reference line 12.

Furthermore either a manually operated tape measure can be used, or a battery operated tape measure can be used having a button to activate power from the batteries which extend or retract the tape. Such battery operated tape measures are available in stores.

As previously discussed the invention can include the tape guide 30 which can be selected at a variety of selected lengths or alternatively not used at all. When the tape guide 30 is utilized a front wall projection 70 can be used which has a recess 72 for slideably receiving the guide 30.

The base 8 can also include a curved base member 70 having a plurality of spaced holes 72 which are disposed at selective angles relative to the center of hole 36. In one embodiment the plurality of holes 72 can be disposed at intervals of 10° or 15° relative to one another. Any angular measurement can be accommodated.

The measuring device 2 also includes detent means 80 which can comprise the plurality of holes 72 as well as the detent structure 74 as shown in FIG. 6. In particular the detent structure 74 can comprise of a plunger or projection 76 encased in a housing 78 having a biasing means such as a spring 80 as shown. The detent 74 can be grasped by the knob 82 so as to pull the plunger 76 out of the hole 72 to the next selected angle.

Accordingly the measuring device 2 can be selectively rotated at for example at 10° intervals or the like so as to sequentially move the rotatable holder and measuring device 16 relative the base 8 to each of the selected angles. The embodiment shows that the measuring device can be rotated at 10° intervals where the scale 15 is slid outwardly to measure the length of the distance from the reference that passes through the center 36 and each of the distances to the arched window.

Figures 9, 10:
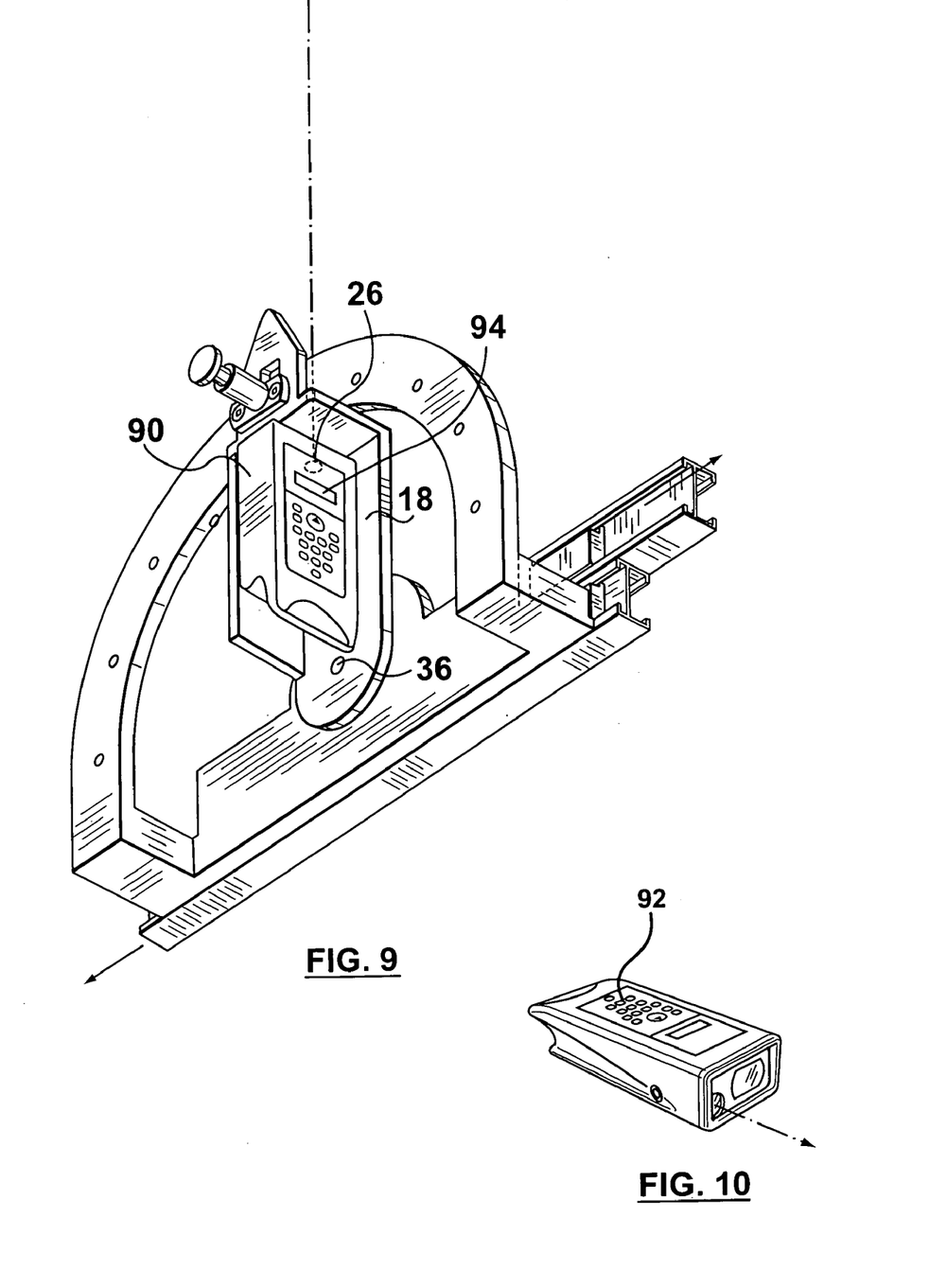
FIG. 9 is a perspective view of another embodiment of the invention comprising a laser reading device.
FIG. 10 is a perspective view of the laser device.

In another embodiment of the invention the tape measure 16 can be replaced by a laser reading device 90.

One such laser device can be purchased from Leica's Disto™ laser distance meter although other laser reading devices can be utilized. The laser reading device 90 can be secured to the holder 18 in any variety of means including screws or the like. The keypad 92 can be programmed so as to start measurements from the center of the reference 36 and digitally display the measurement on the display 94. The front wall 24 of the holder 18 also includes an aperture 26 to permit the laser beam to shine therethrough and reflect off the appropriate edge on the arched window to be bounced back for digital reading of the measurement from the selected position on the arched window 4 and the center or reference 36.

Figure 17:
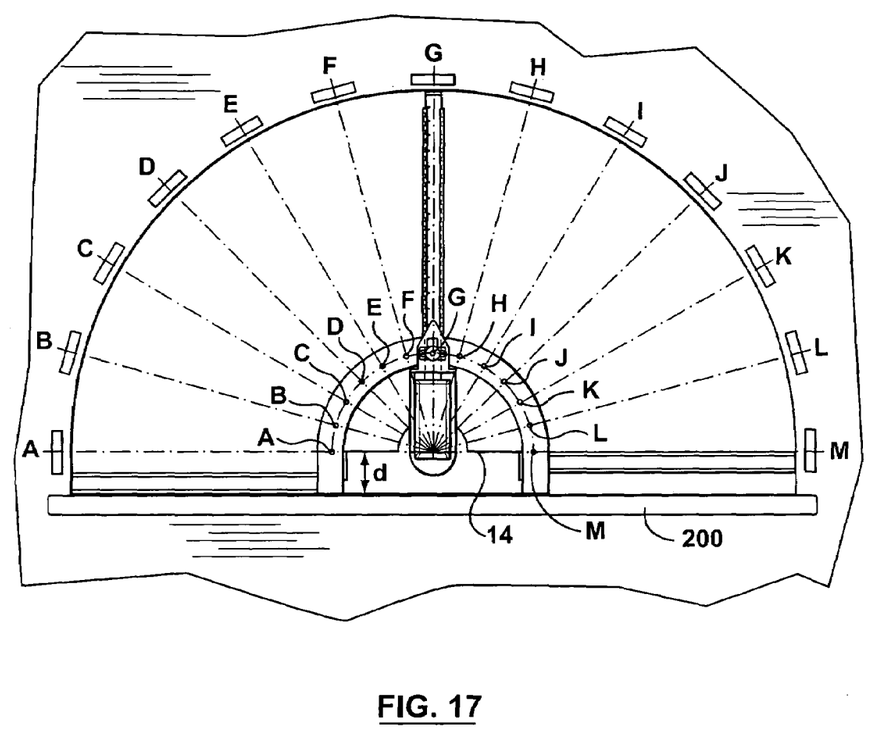
FIG. 17 is a representative view of another embodiment of the invention on an arched window having an opening.

FIG. 17 shows another embodiment of the invention where the arch measuring device 2 sits on a window sill 200. In this case the bottom 202 of the base 8 contacts the sill 200; where the reference line 14 will be spaced a distance d from the sill 200, which will need to be taken into account when measuring the arched window and forming the frame of window shutter or the like. The arched measuring device is moved to the portions A, B, C, D, E, F, G, H, I, J, K, L and M which are spaced at 15° increments and the distance from the center 12 to the arch 4 measured.

Accordingly the measurements from the reference to each of the selected positions on the arched window 4 can be gathered and inputted into a CNC machine whereby a straight frame 100 can be curved or arched by a computerized roll-forming machine such a CNC machine or the like, to produce a frame of a window covering (such as a shutter or the like).

Figures 11, 12:
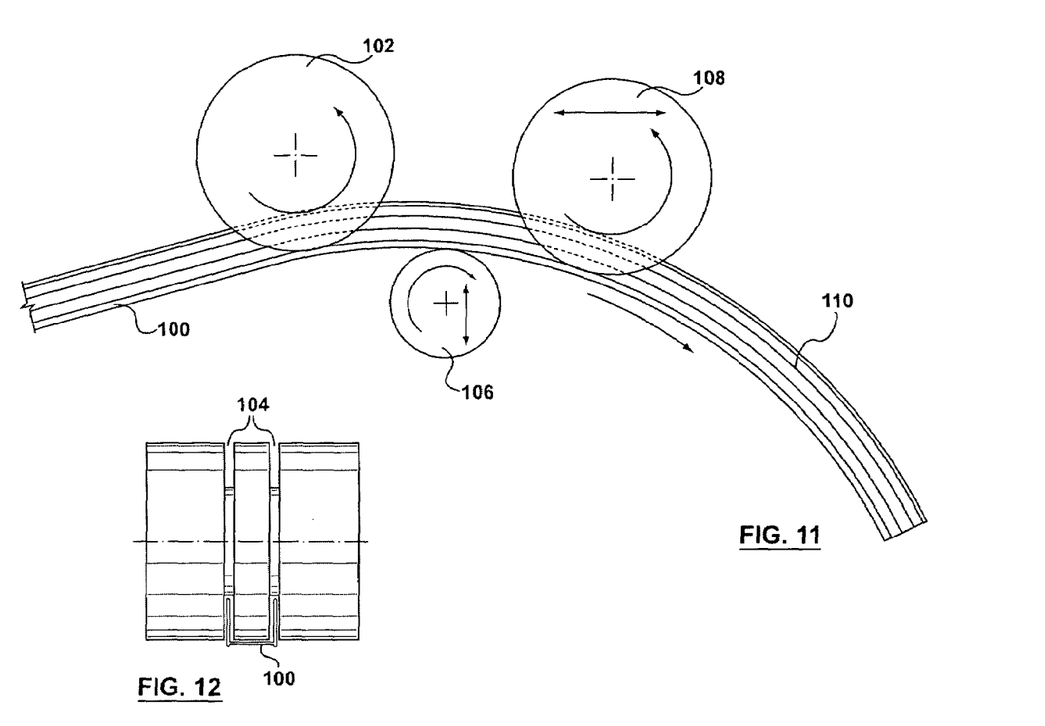
FIG. 11 is a linear cross-section of the arched frame being formed between three rollers of a computerized roll-forming machine.
FIG. 12 is a transverse cross-section of a curved arched frame and one roller of the CNC machine.

The roll-forming machine can comprise a set of rollers which co-operate to affect the desired curvature of the frame 100. Three rollers are shown by way of an example in FIG. 11. A first roller 102 holds the frame 100 in a selected position and feeds the frame 100 towards the other two rollers. As shown in FIG. 12, the first roller 102 comprises slots 104 about the circumference of the roller for engagement of the sides of the frame 100. The frame 100 is shown to have a generally U-shaped cross-sectional although any cross-section can be utilized and the drawings are meant to show an example of same without being limiting.

A second vertically disposed roller 106 is positioned downstream of the first roller 102. A third horizontally displaceable roller 108 is positioned downstream of the second roller 106. The direction of rotation of the first, second and third rollers result in the curvature of the frame 100.

The window measurement data is entered into the processor of the roll-forming machine to vertically displace the second and third rollers to affect the desired curvature of the arched frame. The resulting curvature will correspondence to the measured geometry of the arched window opening as previously described. Since many arched windows are not perfectly formed (i.e. there are irregularities in the dimensions at each of the increments A-M) the arch measuring device can be utilized to measure those irregularities and thereby form an arched frame that will fit snugly into the arched opening in spite of the irregularities.

Figures 13, 14:
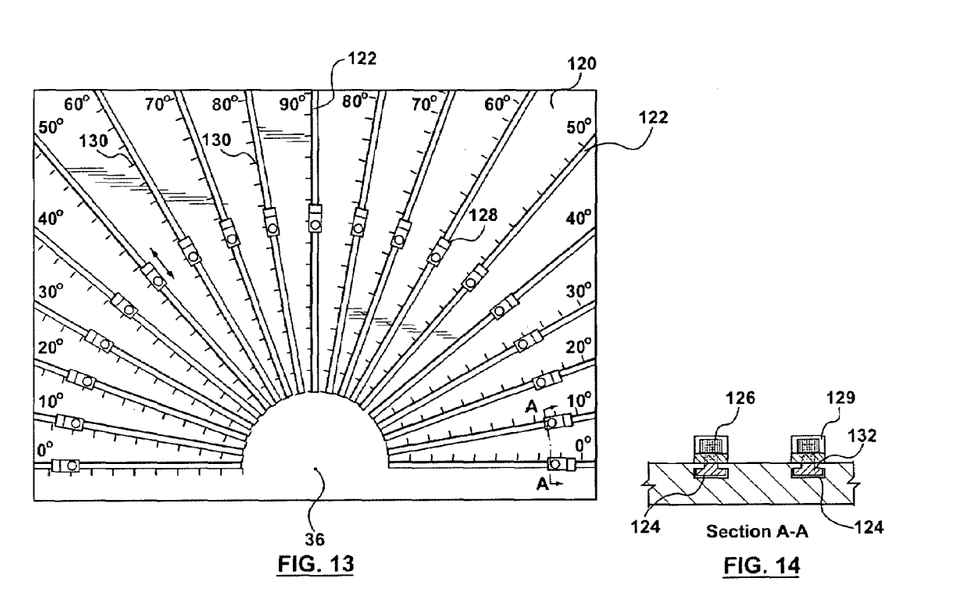
FIG. 13 illustrates a template for verifying the formed arch frame.
FIG. 14 is a cross-sectional view as shown in FIG. 13.
Figure 15:
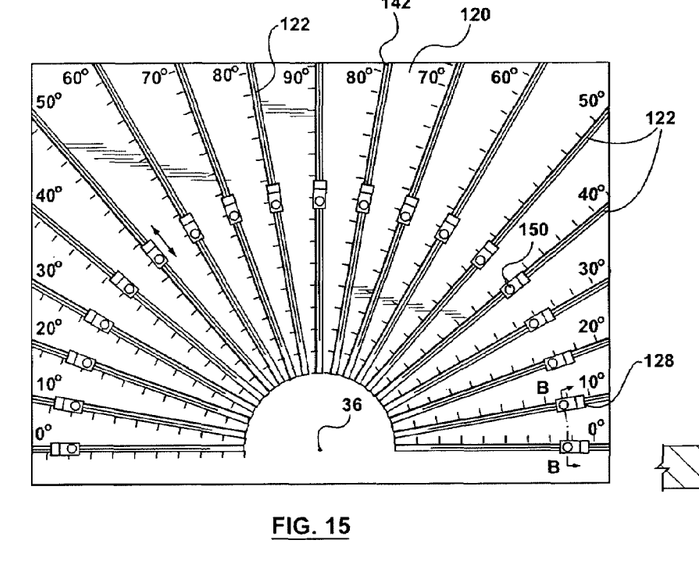
FIG. 15 is another embodiment of the template for verifying the formed arch.

In order to verify that the arched frame portions 110 have been accurately curved a verifying template as shown in FIGS. 13 and 15 can be utilized.

The template as shown in FIGS. 13 and 15 can comprise of a flat surface 120 having a plurality of radially extending members 122. In the embodiment showing the radially extending members 122 are disposed at increments of 10° from the center 36 (however other increments can be used). In the embodiment shown in FIG. 13, the radially extending members can comprise of a plurality of recesses 124 which are adapted to receive measurement recording members 126 having a recording edge 128. Each of the radially extending members 122 have associated therewith a scale 130 whereby the measurement recording edge 128 may be slid relative the bottom surface 120 so as to align with the measurement at the selected angle as previously described. Thereafter the knob 129 can be rotated so as to tighten the leg 132 within the recess 124. This "tongue and groove" relationship secures the measurement recording member at the appropriate position along the scale 130.

In other words when utilizing the measuring device 2 as previously described at each of the selected angles the measurement read can not only be inputted into the CNC machine as previously describe but so can the measurement recording members being manipulated so as to be secured at the same measurement on the verifying template. FIG. 17 illustrates the reading of the measurements at each of the selected increments at A, B, C, . . . M.

Therefore once the window frame is arched in the CNC machine the arched frame may then be placed along the plurality of measurement recording members 126 on the template 120 so as to verify that the arch corresponds thereto.

Figure 16:
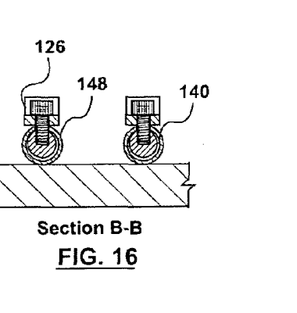
FIG. 16 is a cross-sectional view taken from FIG. 15.

In another embodiment of the invention the radially extending members 122 can comprise of a plurality of hollow tubes 140 having slots 142 therein for receiving the measurement recording members 126 having an edge 128 as previously described. Measurement recording members 126 has an inner member 148 slideable within the hollowed tubes 140. By rotating the head 150, the measurement recording member may be releasably secured to the tubes 140.

The device 2 can be used to measure an arch by:
(a) releasably securing the base 8 to the arch 4 whereby the base includes a measuring structure rotatable relative to the base; and
(b) sequentially rotatably displacing the measuring structure relative to the base 8 for sequentially measuring a distance between the reference i.e. the center 36 for sequentially measuring a distance between the reference point 36 and the arch at the selected positions which as shown comprise at intervals of 10°.

Accordingly the device as described herein can be used to manufacture a frame for an arched window comprising:
(a) releasably securing the base to the arch, where the base includes a measuring structure rotatably relative to the base; and
(b) sequentially rotatably displacing the measuring device relative to the base for sequentially measuring the distance between the reference point and the arch at the selected positions;
(c) bending a frame to correspond to the measurements to form an arched frame;
(d) placing the arched frame relative a template for verifying the bent arched frame.

The invention also describes a template for verifying a formed frame for an arch which comprises:
(a) a flat surface;
(b) a plurality of radially extending members;
(c) a plurality of scales associated with the plurality of radially extending members respectively;
(d) a plurality of measurement recording members slideably securable relative to the plurality of radially extending members for displaying a measurement adjacent the scale.

Figure 18:
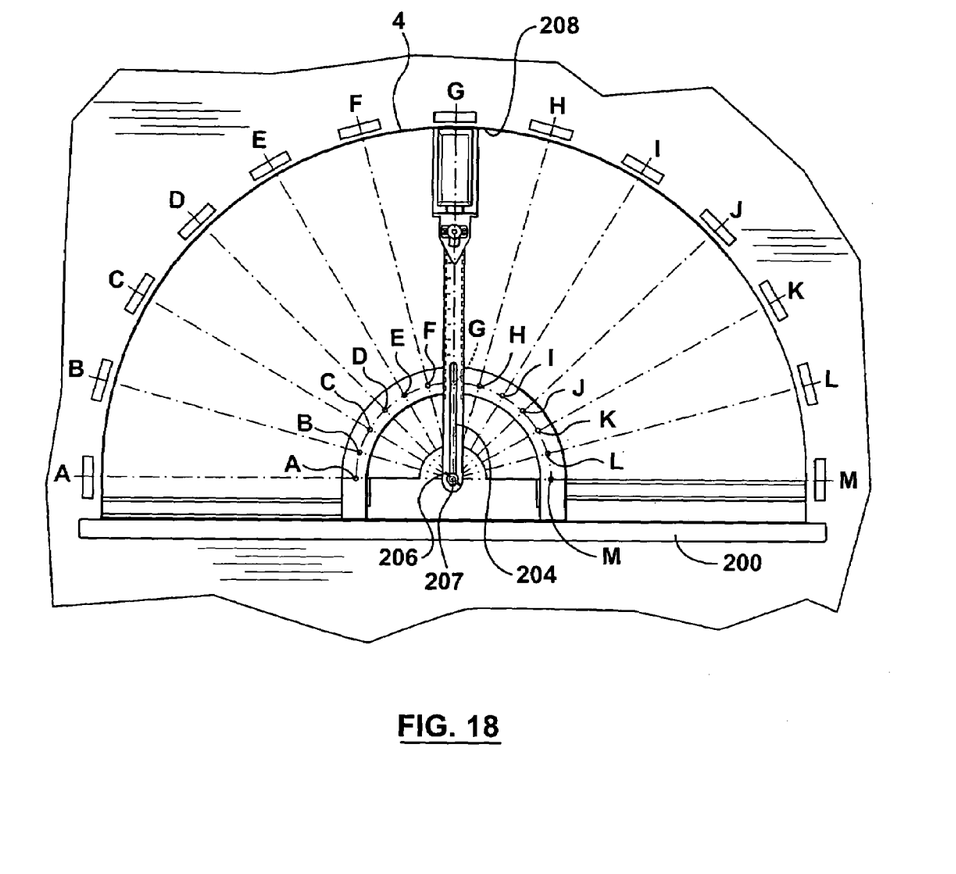
FIG. 18 is a representative view of another embodiment of the invention.

The arch measuring device 2 could also be located adjacent the arch 4 as shown in FIG. 18. In other words, the arch measuring device would slide along the arch 4 and be anchored at one end 208 of a moveable strut or member 210. The strut 210 includes a slot 204 which receives a wing bolt 207 which also passes through the pivot point in base 6. A wing nut 206 can be tightened to rigidify the structure. Thereafter at each position A-M the tape can be extended to read the distance between the arch and the pivot point mentioned before.

Various embodiments of the invention have now been described in detail. Since changes in and/or additions to the above-described best mode may be made without departing from the nature, spirit or scope of the invention, the invention is not to be limited to said details.

We claim:

1. A measuring device for measuring the arc of an arched frame comprising:
    (a) a base having a substantially straight edge;
    (b) measuring means selectively rotatable relative said base for measuring a distance between said base and said arch at a selected angle;
    (c) bracing means slideable substantially parallel to said straight edge for bracing said base relative said arched frame.

2. A measuring device as claimed in claim 1 wherein said base includes a reference.

3. A measuring device as claimed in claim 2 wherein said measuring means comprises a displaceable scale for measuring said distance between said reference and said arch at a selected angle.

4. A measuring device as claimed in claim 3 wherein said measuring means comprises a tape measure.

5. A measuring device as claimed in claim 4 further comprising a holder for holding said tape measure between said reference and said arched frame for selectively rotating said tape measure relative said base for measuring said distance between said reference and said arched window at said selected angle.

6. A measuring device as claimed in claim 5 further including detent means for catching said holder and said tape measure at selected angles for measuring said distance between said reference and said arch at said selected angles.

7. A measuring device as claimed in claim 6 wherein said detent means comprises a plurality of spaced holes presented by said base and a displaceable projection for selectively engaging said holes.

8. A measuring device as claimed in claim 1 wherein said base includes a first base portion and a second base portion wherein said holder has a first end pivotally connected to said first base portion and a second end slideable relative said second base portion.

9. A measuring device as claimed in claim 1 wherein said measuring means comprises laser means for measuring said distance between said reference and said arched window.

10. A measuring device as claimed in claim 8 wherein said first base portion and said second base are on different planes.

11. A method of measuring an arch comprising:
    (a) releasably securing a base to an inside surface of said arch, said base including a measuring means rotatable relative said base;
    (b) sequentially rotatably displacing said measuring means relative said base for sequentially measuring a distance between said reference point and said arch at said selected positions.

12. A method as claimed in claim 11 wherein said measuring means comprises a reading of a tape measure.

13. A method as claimed in claim 11 wherein said measuring comprises a digital readout from a laser measuring device.

14. A method of manufacturing a frame for an arched window comprising:
    (a) releasably securing a base to said arch, said base including a measuring means rotatable relative said base;
    (b) sequentially rotatably displacing said measuring means relative said base for sequentially measuring a distance between said reference point and said arch at said selected positions;
    (c) bending a frame to correspond to said measurements to form said arched frame;
    (d) placing said arched frame relative a template for verifying said arched frame.

15. A method as claimed in claim 14 wherein said sequential measuring provides a plurality of measurements at selected angles of measurement.

16. A method as claimed in claim 15 further comprising displaceable arch verifying means on said template.

17. A template for verifying the formed frame for an arch comprising:
    (a) a flat surface;
    (b) a plurality of radially extending members;
    (c) a plurality of scales associated with said plurality of radially extending members respectively;
    (d) a plurality of measurement recording members slideably securable relative said plurality of radially extending members said plurality of measurement members having an edge for displaying a measurement adjacent said scale, and for contacting said formed frame.

18. A template as claimed in claim 17 wherein said radially extending members comprises a plurality of channels in said flat surface.

19. A template as claimed in claim 17 wherein said radially extending members comprise a plurality of tubular members.

20. A template as claimed in claim 19 wherein said tubular members comprise a plurality of moveable sleeves.

* * * * *